Figure 1:
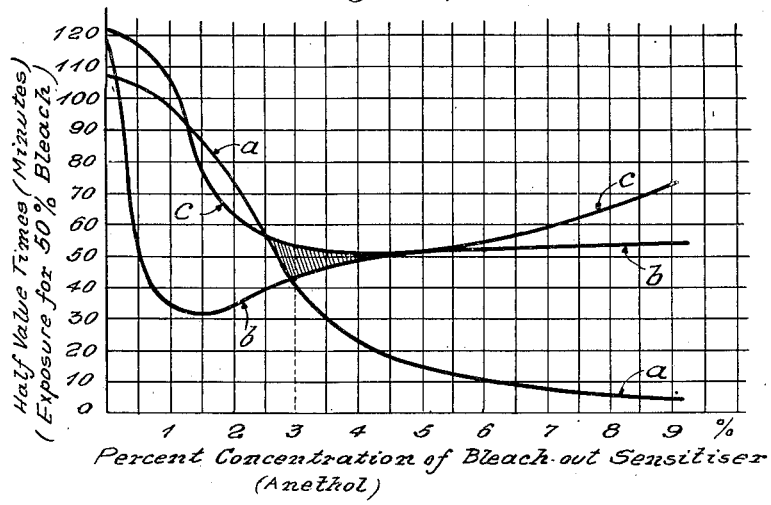
Figure 2:
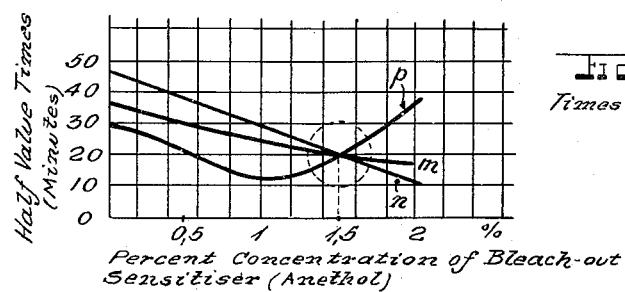
Figure 3:
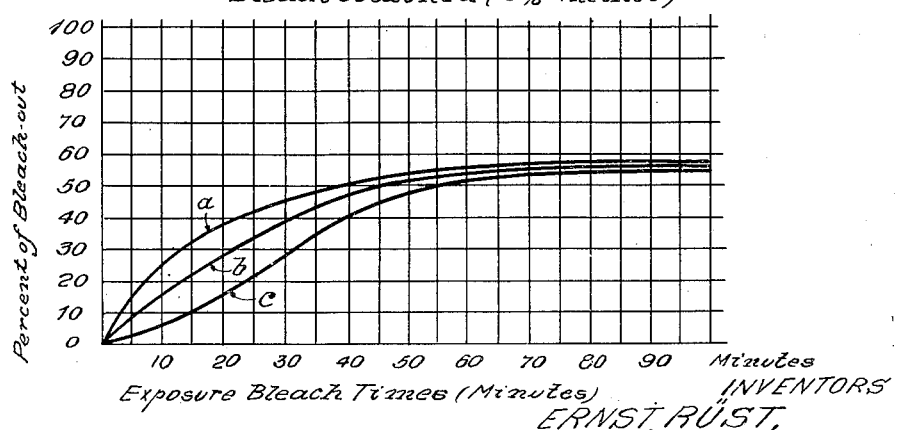

Sept. 15, 1936.  E. RÜST ET AL  2,054,390

PHOTOGRAPHIC BLEACHING-OUT LAYERS

Filed Aug. 29, 1934  2 Sheets-Sheet 1

Times to get 50% Bleach

Times to get 50% Bleach

Bleach obtained (3% Anethol)

INVENTORS
ERNST RÜST,
ANDRÉ POLGÁR,
by William C. Linton.
Attorney